United States Patent
Paterson

(10) Patent No.: US 11,546,810 B2
(45) Date of Patent: Jan. 3, 2023

(54) OBTAINING DISTRIBUTED UNIT'S CONFIGURATION INFORMATION BY A CENTRAL UNIT OF A BASE STATION

(71) Applicant: NEC CORPORATION, Tokyo (JP)

(72) Inventor: Robert Paterson, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/973,246

(22) PCT Filed: Jun. 19, 2019

(86) PCT No.: PCT/JP2019/024331
§ 371 (c)(1),
(2) Date: Dec. 8, 2020

(87) PCT Pub. No.: WO2019/244940
PCT Pub. Date: Dec. 26, 2019

(65) Prior Publication Data
US 2021/0243656 A1 Aug. 5, 2021

(30) Foreign Application Priority Data
Jun. 22, 2018 (GB) ..................... 1810337

(51) Int. Cl.
*H04W 36/00* (2009.01)
*H04W 36/08* (2009.01)
(Continued)

(52) U.S. Cl.
CPC ....... *H04W 36/0033* (2013.01); *H04W 36/08* (2013.01); *H04W 88/085* (2013.01);
(Continued)

(58) Field of Classification Search
CPC .......... H04W 36/0033; H04W 88/085; H04W 76/15; H04W 92/12; H04W 76/27; H04W 36/08
See application file for complete search history.

(56) References Cited

U.S. PATENT DOCUMENTS 11,258,549 B2 * 2/2022 Park ................. H04W 76/15
2019/0215726 A1 * 7/2019 Park ................. H04L 1/08
(Continued)

FOREIGN PATENT DOCUMENTS

WO 2018/203739 A1 11/2018

OTHER PUBLICATIONS

NGMN Alliance, "5G White Paper", V1.0, Next Generation Mobile Networks (NGMN) Alliance, Feb. 2015, 125 pages.
(Continued)

*Primary Examiner* — Allahyar Kasraian
(74) *Attorney, Agent, or Firm* — Sughrue Mion, PLLC

(57) ABSTRACT

A method is presented in which a central unit of a distributed base station apparatus in a cellular communication system sends to a distributed unit of the distributed base station apparatus a first message comprising an information element for requesting the distributed unit of the distributed base station to provide a current distributed unit configuration. The central unit receives, from the distributed unit of the distributed base station apparatus, configuration information for the current distributed unit configuration in a second message sent in response to the first message.

6 Claims, 8 Drawing Sheets

(51) Int. Cl.
  *H04W 88/08* (2009.01)
  *H04W 92/20* (2009.01)
  *H04W 76/15* (2018.01)
  *H04W 8/02* (2009.01)

(52) U.S. Cl.
  CPC .............. *H04W 92/20* (2013.01); *H04W 8/02* (2013.01); *H04W 76/15* (2018.02)

(56) References Cited

U.S. PATENT DOCUMENTS

| | | | |
|---|---|---|---|
| 2019/0215756 A1* | 7/2019 | Park | H04W 40/248 |
| 2019/0246420 A1* | 8/2019 | Park | H04W 72/087 |
| 2019/0253937 A1* | 8/2019 | Hsieh | H04W 36/0061 |
| 2019/0349139 A1* | 11/2019 | Park | H04W 80/02 |
| 2019/0350029 A1* | 11/2019 | Wu | H04W 36/0069 |
| 2020/0120553 A1* | 4/2020 | Wang | H04W 76/16 |
| 2021/0227435 A1* | 7/2021 | Hsieh | H04W 36/0055 |
| 2021/0368500 A1* | 11/2021 | Centonza | H04W 76/15 |

OTHER PUBLICATIONS

3rd Generation Partnership Project; Technical Specification Group Radio Access Network; NG-RAN; F1 application protocol (F1AP) (Release 15), 3GPP TS38.473 V15.1.0, Mar. 2018, 106 pages, Sophia Antipolis Valbonne, France.
3rd Generation Partnership Project; Technical Specification Group Radio Access Network; NR; Medium Access Control (MAC) protocol specification (Release 15), 3GPP TS 38.321 V15.1.0, Mar. 2018, 67 pages, Sophia Antipolis Valbonne, France.
3rd Generation Partnership Project; Technical Specification Group Radio Access Network; Evolved Universal Terrestrial Radio Access Network (E-UTRAN); X2 application protocol (X2AP) (Release 15), 3GPP TS 36.423 V15.1.0, Mar. 2018, 354 pages, Sophia Antipolis Valbonne, France.
3rd Generation Partnership Project; Technical Specification Group Radio Access Network; NR; Radio Resource Control (RRC) protocol specification (Release 15) 3GPP TS 38.331 V15.1.0, Mar. 2018, 268 pages, Sophia Antipolis Valbonne, France.
Catt, "TP on suppor of delta configuration during handover procedure", R3-180191, 3GPP TSG-RAN WG3 Meeting #ADhoc1801, Jan. 22-26, 2018, 5 pages, Sophia Antipolis, France.
Catt, "TP for 38.473 on suppor of delta configuration during handover procedure", R3-180802, 3GPP TSG-RAN WG3#99 Feb. 26-Mar. 2, 2018, 3 pages, Athens, Greece.
Catt, "Discussion on support of delta configuration during handover procedure", R3-180801, 3GPP TSG-RAN WG3#99 Feb. 26-Mar. 2, 2018, 2 pages, Athens, Greece.
HTC, TP for 36.423 on supporting delta signalling for SN change, R3-173870, 3GPP TSG-RAN3 Meeting #97bis Oct. 9-13, 2017, 19 pages, Prague, Czech Republic.
NEC, DU Configuration Query, R3-183921, 3GPP TSG-RAN3-AH-1807 Jul. 2-6, 2018, 2 pages, Montreal, Canada.
International search report for PCT/JP2019/024331 dated Oct. 2, 2019.
WO/ISA for PCT/JP2019/024331 dated Oct. 2, 2019.
Search Report for GB1810337.4 dated Nov. 29, 2018.
Japanese Office Action for JP Application No. 2020-571003 dated Feb. 15, 2022 with English Translation.
European Office Action for EP Application No. 19736826.9 dated Mar. 23, 2022.
3GPP TS 38.473 V15.1.1 (Apr. 2018), 3GPP; TSG-RAN; NG-RAN; F1 application protocol(F1AP) (Release 15).
3GPP TS 38.473 V15.0.0 (Dec. 2017), 3GPP; TSG-RAN; NG-RAN; F1 application protocol(F1AP) (Release 15).

* cited by examiner

OBTAINING DISTRIBUTED UNIT'S CONFIGURATION INFORMATION BY A CENTRAL UNIT OF A BASE STATION

CROSS-REFERENCE TO RELATED APPLICATIONS

This application is a National Stage of International Application No. PCT/JP2019/024331 filed Jun. 19, 2019, which claims priority under U.S.C. § 119(a) to British Patent Application No. GB1810337.4 filed on Jun. 22, 2018.

TECHNICAL FIELD

The present invention relates to mobile communications devices and networks, particularly but not exclusively those operating according to the 3rd Generation Partnership Project (3GPP) standards or equivalents or derivatives thereof. The invention has particular although not exclusive relevance to Dual Connectivity (DC) configurations in the so-called 'fourth generation', '4G' (or 'LTE') systems, 'fifth generation', '5G' (or 'Next Generation'/'New Radio') systems, and derivatives and hybrid configurations of such systems. The invention relates particularly but not exclusively to Multi-Radio Access Technology (multi-RAT) Dual Connectivity (MR-DC) configurations such as Evolved UMTS Terrestrial Radio Access (E-UTRA) New Radio (NR) Dual Connectivity (EN-DC) and other similar configurations.

BACKGROUND ART

The latest developments of the 3GPP standards are referred to as the Long Term Evolution (LTE) of Evolved Packet Core (EPC) network and Evolved UMTS Terrestrial Radio Access Network (E-UTRAN), also commonly referred as '4G'. In addition, the term '5G' and 'new radio' (NR) refer to an evolving communication technology that is expected to support a variety of applications and services such as Machine Type Communications (MTC), Internet of Things (IoT) communications, vehicular communications and autonomous cars, high resolution video streaming, smart city services, and/or the like. Accordingly, 5G technologies are expected to enable network access to vertical markets and support network (RAN) sharing for offering networking services to third parties and for creating new business opportunities. 3GPP intends to support 5G by way of the so-called 3GPP Next Generation (NextGen) radio access network (RAN) and the 3GPP NextGen core (NGC) network (also referred to as the '5G Core' (5GC)). Various details of 5G networks are described in, for example, the 'NGMN 5G White Paper' V1.0 by the Next Generation Mobile Networks (NGMN) Alliance, which document is available from https://www.ngmn.org/5g-white-paper.html.

In order to access the wider communication network, user communication devices (user equipment or 'UEs') connect to the network (4G and/or 5G) via radio access network (RAN) equipment comprising one or more base stations. A base station associated with a 4G network is typically referred to as an evolved NodeB ('eNB') whereas a base station associated with a 5G network may be referred to as a New Radio Base Station ('NR-BS') or as a 'gNB'. It will be appreciated, however, that such RAN apparatus/base stations may be referred to using alternative terms. For example, 5G base stations may sometimes be referred to as eNBs (or 5G/NR eNB) which is more typically associated with LTE base stations. The functionality of a gNB (referred to herein as a 'distributed' gNB) may be split between one or more distributed units (DUs' or 'gNB-DUs') and a central unit ('CU' or 'gNB-CUs'), with a CU typically performing higher level functions and communication with the next generation core and with the DU performing lower level functions and communication over an air interface with user equipment (UE) in the vicinity (i.e. in a cell operated by the gNB).

Recently, discussions have been ongoing with respect to 'multi-connectivity' operation using E-UTRA and NR radio access technologies, i.e. how base stations of fourth and fifth generations should interact with one another when providing cellular access, for user equipment, to their respective core networks. Such 'multi-connectivity' scenarios may include Multi-RAT Dual Connectivity (MR-DC) scenarios. In these scenarios, for example, at least one 4G base station and at least one 5G base station are configured to serve a UE. One of the base stations in such a scenario provides control plane signalling (and possibly user plane signalling also) and may be termed the 'master' base station. Each other base station provides user plane signalling and may be termed a 'secondary' base station, though other terms may be used, such as 'master node (MN)' and 'secondary node (SN)'. Several MR-DC scenarios are possible including:

E-UTRA-NR Dual Connectivity (EN-DC)—which is where the 'master' base station (MN) is a 4G base station (master eNB or 'MeNB') and the secondary base station (SN) is a 5G base station (secondary gNB or 'SgNB'). In this situation, the gNB is sometimes referred to as en-gNB, because it provides NR user plane and control plane protocol terminations towards the UE, and acts as secondary node in EN-DC. The base stations are connected via a base station to base station interface, such as an X2 interface. The UE's control plane traffic will terminate in the master base station's core network (in this scenario at an EPC communication entity such as a mobility management entity, MME, associated with the MeNB) via a base station—core network control plane interface, such as the S1-C or S1-MME interface. The UE's user plane traffic will also terminate in the MeNB's core network (e.g. at a serving gateway 'S-GW') via one or more base station—core network user plane interfaces, such as the S1-U interface. Depending on configuration, both the MeNB and SgNB may each have a respective S1-U interface with the core network, or only the MeNB may have an S1-U interface.

NG-RAN E-UTRA-NR Dual Connectivity (NGEN-DC)—which is where the 'master' base station (MN) is a 4G base station (master eNB or 'MeNB') and the secondary base station (SN) is a 5G base station (secondary gNB or 'SgNB'). In this scenario, however, the MeNB is connected to the 5GC via a 5G user plane interface (e.g. 'NG-U') and a 5G control plane interface (e.g. 'NG-C'). The base stations are connected via a base station to base station interface, such as an Xn interface. The UE's control plane traffic will terminate at a 5G core network entity (e.g. the access and mobility function, AMF) via an appropriate interface (e.g. the NG-C interface) with the MeNB. The UE's user plane traffic will also terminate in the 5G core network via one or more base station—core network user plane interfaces, such as the NG-U interface. Depending on configuration, both the MeNB and SgNB may each have a respective NG-U interface with the core network, or only the MeNB may have an NG-U interface.

NR-E-UTRA Dual Connectivity (NE-DC)—which is where the 'master' base station (MN) is a 5G base station (master gNB or 'MgNB') and the secondary base station (SN) is a 4G base station (secondary eNB or 'SeNB'). In this situation, the SeNB may be referred to as a secondary ng-eNB. The base stations are connected via a base station to base station interface, such as an Xn interface. The UE's control plane traffic will terminate at a 5G core network entity (e.g. the access and mobility function, AMF) via an appropriate interface (e.g. the NG-C interface) with the MgNB. The UE's user plane traffic will also terminate in the 5G core network via one or more base station—core network user plane interfaces, such as the NG-U interface. Depending on configuration, both the MgNB and SeNB may each have a respective NG-U interface with the core network, or only the MgNB may have an NG-U interface.

In the context of MR-DC, there have been ongoing discussions related to the issue of how to efficiently and effectively provide, to other communication entities in the wider communication network, an accurate and up-to-date indication of the radio configurations being employed at base stations (and in particular for gNBs/gNB-DUs) for the UE(s) that they serve.

A Radio Resource Control (RRC) message (e.g. an RRC Connection Reconfiguration message) is sent to the UE to provide the appropriate configuration information for a group of cells operating under the master node in the MR-DC configuration. For EN-DC, in the context of distributed gNBs, this RRC message consists of information generated by an en-gNB-CU and information generated by an en-gNB-DU. This information comprises cell group configuration information which is typically signalled in a dedicated information element (e.g. the 'CellGroupConfig' IE).

In general, the configuration information may be provided (e.g. in RRC messages) as a 'full' configuration or a 'delta' configuration. A 'full' configuration provides all the required configuration information whereas a 'delta' configuration provides details of only those configurations that have changed since an earlier configuration was provided. Typically, when an EN-DC configuration is first set up, the first message of the procedure providing configuration information includes a full configuration, and subsequent messages providing configuration information (e.g. following modifications to the configuration information) are delta configurations. For example, if a data bearer is added, the gNB-DU typically changes some of the configuration information and provides details of the changed information in the CellGroupConfig IE, as a delta configuration.

Delta configurations are generally preferable from the point of view of message size. However, full configurations ensure that any incorrect configuration parameter values that are being applied (e.g. because earlier delta/full configuration information has been missed or misapplied) are reset to the correct values.

SUMMARY OF INVENTION

During inter-DU mobility (and similar) procedures, the cell group configuration information is set by the target node (e.g. an en-gNB-DU) of the mobility procedure. However, it is apparent that the current mechanisms for providing configuration information in such procedures does not always allow for the most efficient transfer of such configuration information between the nodes of the communication network and the UE.

For example, during mobility procedures in which a gNB-CU decides to change the UE's connection from a current (source) gNB-DU to another (target) gNB-DU the current mechanisms for providing configuration information can be inefficient.

The present invention aims to provide methods, apparatus and a communication system that address or at least partially ameliorate the above issues.

The present invention is set out in the appended independent claims. Optional features are set out in the appended dependent claims.

According to one example aspect of the present invention there is provided, a method performed by a central unit of a distributed base station apparatus in a cellular communication system, the method comprising: sending, to a distributed unit of the distributed base station apparatus that serves a user equipment, 'UE', a first message comprising an information element, 'IE', for requesting the distributed unit of the distributed base station to provide a current distributed unit configuration; and receiving, from the distributed unit of the distributed base station apparatus, configuration information for the current distributed unit configuration in a second message sent in response to the first message.

According to one example aspect of the present invention there is provided, a method performed by a distributed unit of a distributed base station apparatus that serves a user equipment, 'UE', in a cellular communication system, the method comprising: receiving, from a central unit of the distributed base station apparatus, a first message comprising an information element, 'IE', for requesting the distributed unit of the distributed base station to provide a current distributed unit configuration; and sending, in response to the first message, to the central unit of the distributed base station apparatus, configuration information for the current distributed unit configuration in a second message.

According to one example aspect of the present invention there is provided, a central unit of a distributed base station apparatus of a cellular communication system, the central unit comprising: means for sending, to a distributed unit of the distributed base station apparatus that serves a user equipment, 'UE', a first message comprising an information element, 'IE', for requesting the distributed unit of the distributed base station to provide a current distributed unit configuration; and means for receiving, from the distributed unit of the distributed base station apparatus, configuration information for the current distributed unit configuration in a second message sent in response to the first message.

According to one example aspect of the present invention there is provided, a distributed unit of a distributed base station apparatus for serving a user equipment, 'UE', in a cellular communication system, the distributed unit comprising: means for receiving, from a central unit of the distributed base station apparatus, a first message comprising an information element, 'IE', for requesting the distributed unit of the distributed base station to provide a current distributed unit configuration; and means for sending, in response to the first message, to the central unit of the distributed base station apparatus, configuration information for the current distributed unit configuration in a second message.

Example aspects of the invention extend to corresponding systems, apparatus, and computer program products such as computer readable storage media having instructions stored thereon which are operable to program a programmable processor to carry out a method as described in the example aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

Although for efficiency of understanding for those of skill in the art, the invention will be described in detail in the context of a 3GPP system (5G networks), the principles of the invention can be applied to other systems in which slice scheduling is performed.

BRIEF DESCRIPTION OF DRAWINGS

Example embodiments of the invention will now be described, by way of example, with reference to the accompanying drawings in which.

DESCRIPTION OF EMBODIMENTS

Overview

Figure 1:
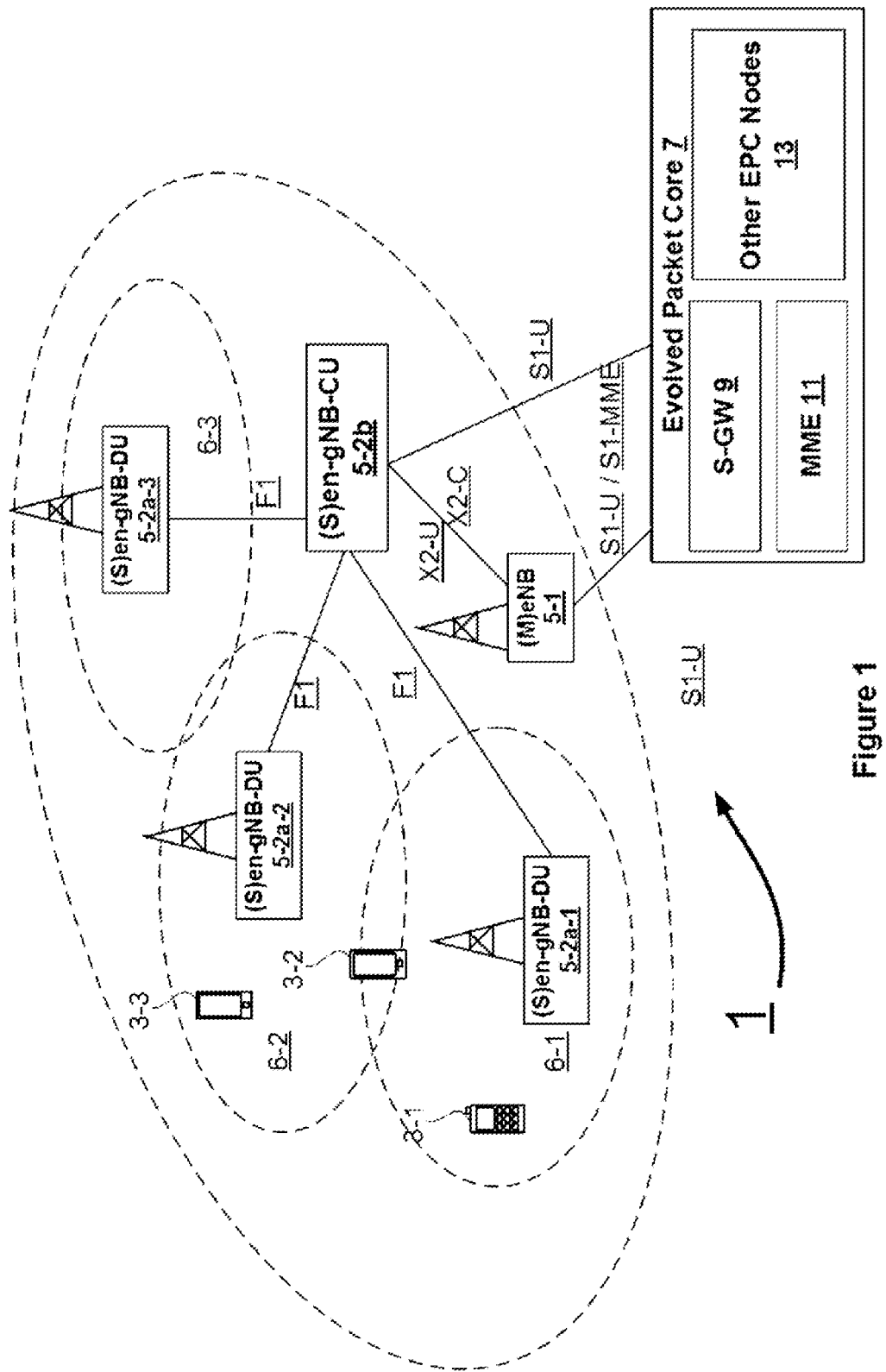
FIG. 1 illustrates schematically a mobile (cellular or wireless) telecommunication system to which example embodiments of the invention may be applied.

FIG. 1 illustrates schematically a mobile (cellular or wireless) telecommunication system 1 to which example embodiments of the invention may be applied.

In the telecommunication system 1, items of user equipment (UEs) 3-1, 3-2, 3-3 can communicate with one another and other UEs via respective base stations 5-1, 5-2 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst three mobile devices 3 and two base stations 5 are shown in FIG. 1 for illustration purposes, the system, when implemented, will typically include other base stations and UEs.

The core network 7, in this example, comprises an evolved packet core (EPC). The EPC 7 includes a serving gateway (S-GW) 9 and a mobility management entity (MME) 11, in addition to other EPC nodes 13 that are well understood in the art.

The base stations 5 include a base station (gNB) 5-2 configured to operate in accordance with next generation (5G) standards and a base station (eNB) 5-1 configured to operate in accordance with 4G standards. In this example, the gNB 5-2 comprises a distributed gNB 5-2 having a central unit (gNB-CU) 5-2b and a plurality of distributed units (gNB-DUs) 5-2a-1 to 5-2a-3 each of which serves at least one associated cell 6-1 to 6-3 respectively. The central and distributed units of the gNB 5-2 communicate with one another over a dedicated interface (known as the F1 or F1 application protocol 'F1AP' interface).

The base stations are configured in an EN-DC configuration in which the eNB 5-1 acts as a 'master' base station (MeNB) and the gNB 5-2 acts as a secondary base station (SgNB). In FIG. 1, the gNB 5-2 is therefore referred to as en-gNB (and the corresponding central unit and distributed unit referred to as an en-gNB-CU and en-gNB-DU respectively). The secondary gNB-CU 5-2b and master eNB 5-1 are connected via a base station to base station interface (in this example an X2 interface providing control plane, X2-C, and user plane, X2-U, communication). The UE's control plane traffic will terminate in the master eNB's core network 7 (e.g. at the MME 11) via a base station—core network control plane interface (in this example an S1-MME interface). The UE's user plane traffic will also terminate in the master eNB's core network (e.g. at the S-GW 9) via one or more base station—core network user plane interfaces, such as the S1-U interface. In this example both the master eNB 5-1 and central unit of the secondary gNB 5-2 (en-gNB-CU 5-2) have a respective S1-U interface with the core network 7.

Each UE 3 and its serving base station (or serving base station distributed unit) 5 are connected via an appropriate air interface (for example the so-called 'Uu' interface and/or the like).

As the UEs 3 move within the communication system 1 there may be instances where the there is a change in the distributed unit 5-2a of the en-gNB 5-2 (referred to as inter-DU mobility). For example, UE 3-2 in FIG. 1 is shown moving from cell 6-1 to cell 6-2 resulting in mobility being triggered at the central unit CU 5-2b of the en-gNB 5-2 from the en-gNB-DU 5-2a-1 (acting as a source DU) to en-gNB-DU 5-2a-2 (acting as a target DU). This change typically requires a change in the cell group configuration information that needs to be delivered to the UE for successful communication via the target en-gNB-DU 5-2a-2. This new cell group configuration information is generated at the target gNB-DU 5-2a-2, when requested by the gNB-CU 5-2b to set up an appropriate UE context, and provided to the gNB-CU 5-2b either as 'full' or 'delta' cell group configuration information.

In order to facilitate the potential provision of the cell group configuration information as delta configuration information, the target en-gNB-DU 5-2a-2 may be provided with the full configuration information for the source en-gNB-DU 5-2a-1 by the gNB-CU 5-2b. This configuration information may be provided, for example, in a CellGroupConfig IE within a CU to DU container IE carried by a UE context setup request message (e.g. an F1 application protocol, 'F1AP', UE Context Setup Request message) sent by the gNB-CU 5-2b to the target en-gNB-DU 5-2a-2 when a decision has been made to transfer the UE context to that target en-gNB-DU 5-2a-2.

Hypothetically, it may be possible for the gNB-CU 5-2b to generate the cell group configuration information (e.g. the contents of the CellGroupConfig IE), describing the full source DU configuration, itself by maintaining a local version of the cell group configuration information and updating this local version each time updates to the cell group configuration information are received (e.g. in a CellGroupConfig IE) from the source en-gNB-DU 5-2a-1. However, this process is potentially at risk of error and it is possible that gNB-CUs may be required to handle cell group configuration information updates from DUs transparently. If the gNB-CUs are required to handle cell group configuration information updates from DUs transparently, the gNB-CU 5-2b will not be able to maintain an up-to-date version of the configuration information for the source en-gNB-DU 5-2a-1 and will not, therefore, be able to provide the cell group configuration information for the source en-gNB-DU 5-2a-1 to the target en-gNB-DU 5-2a-2. Thus, it will not be possible for the target en-gNB-DU 5-2a-2 to provide a delta configuration and will therefore have to provide a full configuration.

Beneficially, the gNB-CU 5-2b and gNB-DUs 5-2a are configured to support a procedure whereby the gNB-CU 5-2b can facilitate delta configurations by the target en-gNB-DU 5-2a-2 while still being able to handle cell group configuration information updates from the source en-gNB-DU 5-2a-1 transparently.

Specifically, the gNB-CU 5-2b is configured to support a procedure in which the gNB-CU 5-2b is able effectively to request the source en-gNB-DU 5-2a-1 to provide its configuration information for a UE, when required (e.g. after a decision has been made to transfer the context for that UE to that target en-gNB-DU 5-2a-2), and the en-gNB-DUs 5-2a are configured to provide, in response to such a request, the configuration information for the UE.

Beneficially, in this example, the request is made by adding a dedicated query information element (e.g. a single bit IE, true/false flag, or the like), to a UE context modification request message (e.g. an F1 application protocol UE Context Modification Request message with only mandatory IEs and the query IE), to indicate that the UE context modification request message is being sent to request the provision of the recipient's configuration information for a UE 3 (e.g. a UE identified in the UE Context Modification Request). In response to the request, if supported, the recipient distributed unit (e.g. the source en-gNB-DU 5-2a-1 in this example) beneficially provides the configuration information for the UE 3 in a UE context modification response message (e.g. an F1 application protocol UE Context Modification Response message).

The configuration information provided by the recipient DU will typically include a complete description of the corresponding UE's context in a DU to CU container IE (e.g. the F1AP DU to CU Container IE). Whilst the current DU to CU Container IE has the option to include information in three RRC IEs (CellGroupConfig IE, MeasGapConfig IE and Requested P-MaxFR1 IE) it will be appreciated that the recipient DU need only include cell group configuration information (e.g. in the CellGroupConfig IE) and possibly measurement gap configuration information (e.g. in the MeasGapConfig IE). The recipient DU need not, for example, include information in the Requested P-MaxFR1 IE as this is not part of the UE configuration.

It will be appreciated, however, that there are other ways in which a dedicated request for cell group configuration information could be made to the DU and/or the requested cell group configuration information could be provided by the recipient DU.

The query IE may be referred to as a 'DU Config Indicator' IE, a 'DU Config Query' IE or any other suitable name for conveying the same purpose (i.e. to enable a CU to request a DU to report the current configuration for a UE in its entirety).

It will be appreciated that this procedure for acquiring configuration information for a UE from a gNB DU may be used in a number of different procedures including mobility and handover procedures. The procedure may be used, for example:

After a gNB-CU has received an X2AP: SgNB Modification Request IE from the MeNB (possibly in response to it containing a secondary cell group (SCG) Configuration Query IE to query a current secondary cell group configuration for supporting delta configuration signalling at the MeNB);

After a decision in gNB-CU to move the UE context from one gNB-DU to another gNB-DU within the same gNB-CU, before sending an F1AP: UE Context Setup Request to a target gNB-DU; and/or After a decision in a gNB-CU to move the UE context to another en-gNB, before sending X2AP: SgNB Change Required to the MeNB.

Accordingly, the gNB-CU 5-2b is able to provide the target en-gNB-DU 5-2a-2 with the acquired cell group configuration information for the source en-gNB-DU 5-2a-1, while still while still being able to handle the CellGroupConfig IE transparently when received in other procedures, and enabling delta configurations by the target en-gNB-DU 5-2a-2.

User Equipment (UE)

Figure 2:
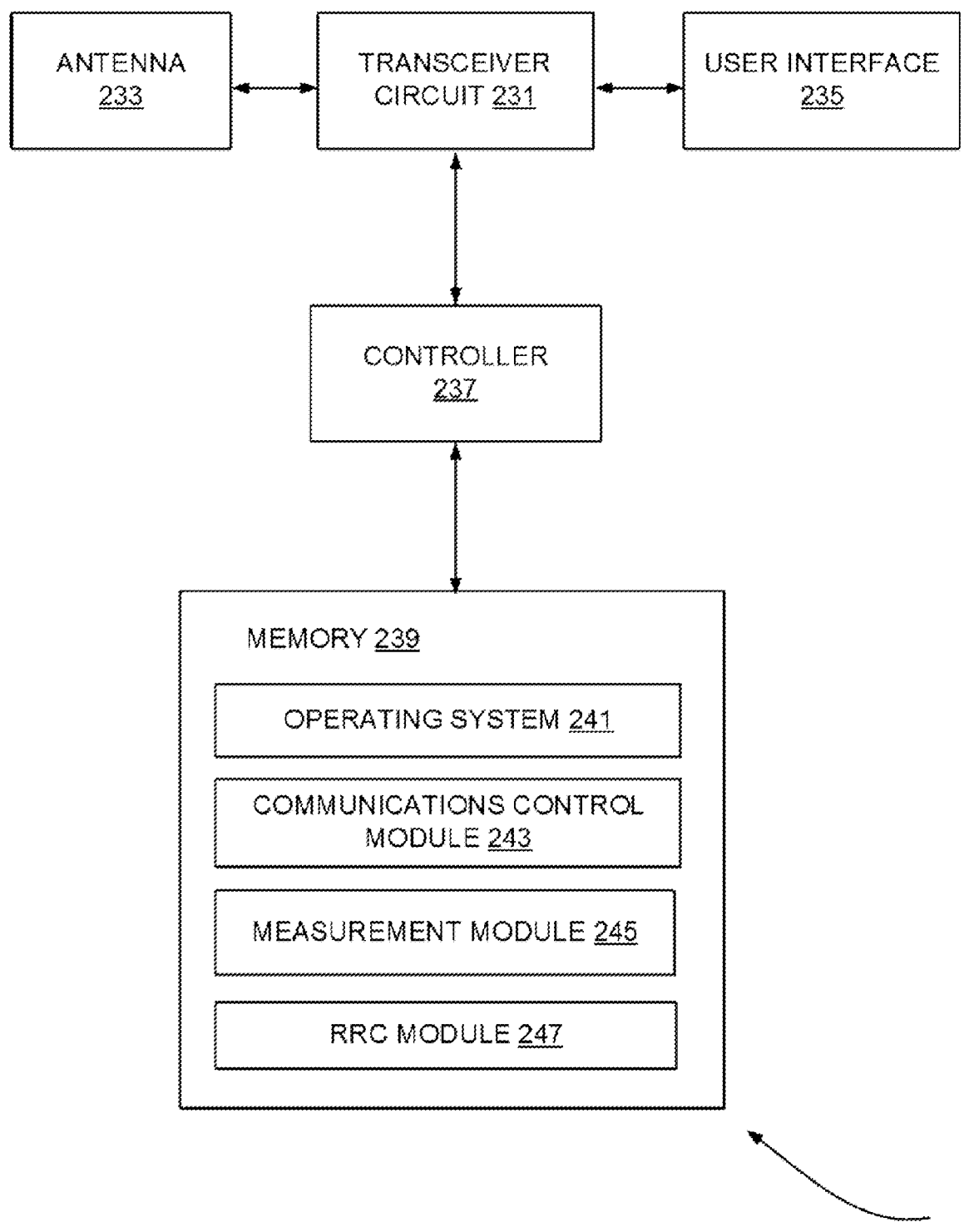
FIG. 2 is a simplified schematic block diagram of a mobile device forming part of the system shown in FIG. 1.

FIG. 2 is a block diagram illustrating the main components of user equipment (UE) 3 suitable for the communication system 1 shown in FIG. 1.

As shown, the UE 3 includes a transceiver circuit 231 which is operable to transmit signals to and to receive signals from the connected node(s) via one or more antenna 233. Although not necessarily shown in FIG. 2, the UE 3 will of course have all the usual functionality of a conventional mobile device (such as a user interface 235) and this may be provided by any one or any combination of hardware, software and firmware, as appropriate.

A controller 237 controls the operation of the UE 3 in accordance with software stored in a memory 239. The software may be pre-installed in the memory 239 and/or may be downloaded via the telecommunication system 1 or from a removable data storage device (RMD), for example. The software includes, among other things, an operating system 241, a communications control module 243, a measurement module 245 and an RRC module 247.

The communications control module 243 is operable to control the communication between the UE 3 and the base stations 5. The communications control module 243 also controls the separate flows of uplink data and control data that are to be transmitted to the base station(s) 5 and the reception of downlink data and control data transmitted by the base station(s) 5. The communications control module 243 is responsible, for example, for managing the UE's part in idle and connected mode procedures such as cell (re) selection, camping on cells, listening for system information, random access channel (RACH) procedures etc.

The measurement module 245 handles the performance of measurements of communication conditions (e.g. received signal power and quality) in the serving and neighbouring cells (e.g. based on measurement configuration and control information received from the base station 5). The measurement module 245 also generates associate measurement reports for transmission to the base station 5

The RRC module 247 is responsible for controlling the RRC layer functionality of the UE 3 (under the overall control of the communications control module 243).

LTE Base Station (eNB)

Figure 3:
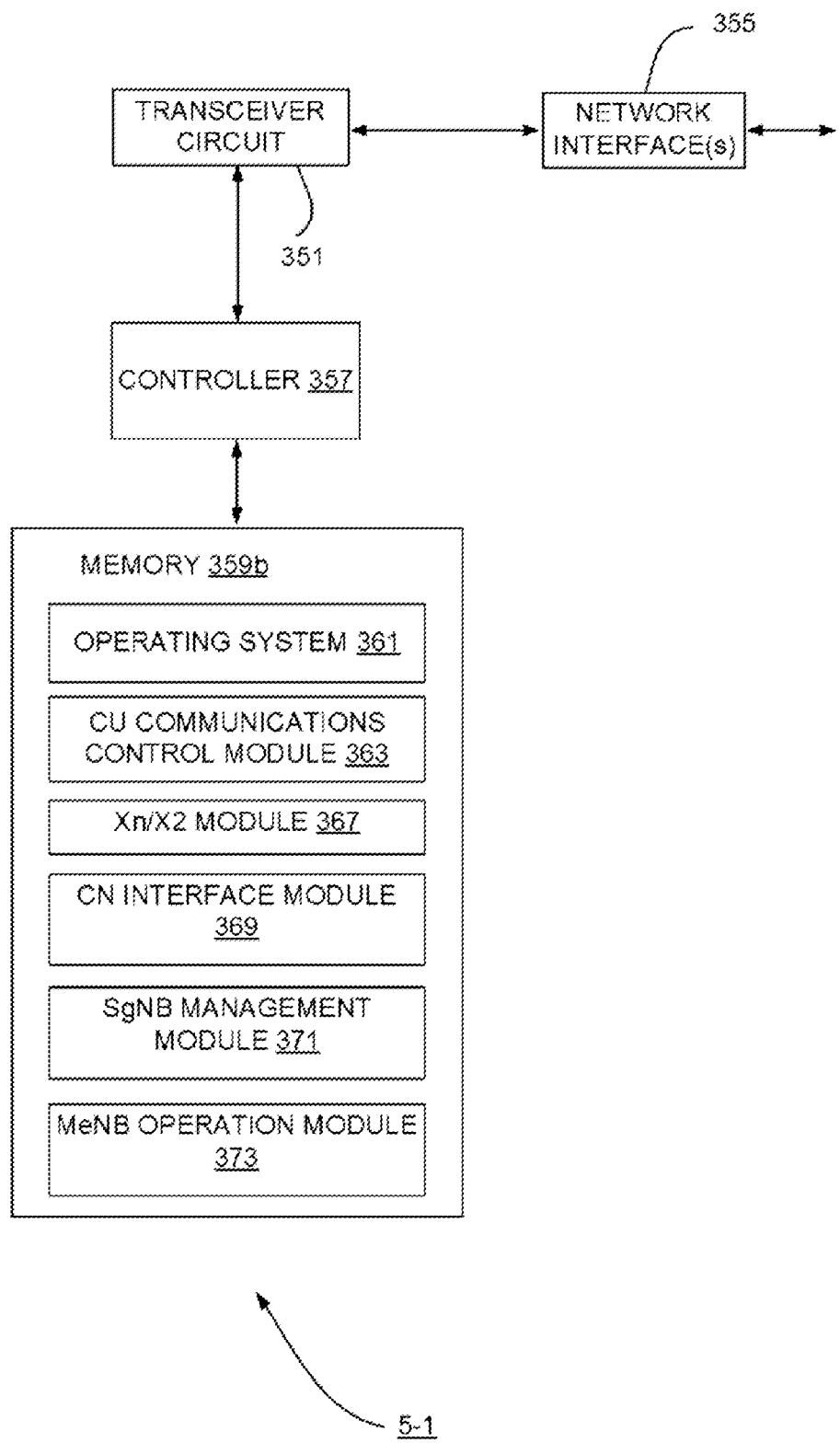
FIG. 3 is a simplified schematic block diagram of an eNB forming part of the system shown in FIG. 1.

FIG. 3 is a block diagram illustrating the main components of the eNB 5-1 (i.e. the MeNB), shown in FIG. 1.

As shown, the eNB 5-1 includes at least one transceiver circuit 351 which is operable to transmit signals to and to receive signals from connected UE(s) 3 via one or more antenna 353 and to transmit signals to and to receive signals from other network nodes (either directly or indirectly) via a network interface 355. The network interface 355 typically includes one or more base station—base station interfaces (such as X2/Xn) and one or more base station—core network interfaces (such as S1/N1/N2/N3).

A controller 357 controls the operation of the base station 5-1 in accordance with software stored in a memory 359. The software may be pre-installed in the memory 359 and/or may be downloaded via the telecommunication network 1 or from a removable data storage device (RMD), for example. The software includes, among other things, an operating system 361, a communications control module 363, a Xn/X2 module 365 a CN interface module 367, a SN management module 371 and an MeNB operation module 373.

The communications control module 363 is responsible for handling (generating/sending/receiving) signalling between the base station 5-1 and other nodes, such as the UE 3 and core network nodes. The communications control module 363 also controls the separate flows of uplink and downlink user traffic and control data to be transmitted to the UEs 3 served by eNB 5-1 (and gNBs operating as secondary gNBs) including, for example, control data for managing operation of the UEs 3.

The communications control module 363 is responsible, for example, for controlling procedures such as the communication of measurement control/configuration information, system information, the eNB's part in random access channel (RACH) procedures etc. The communications control module 363 is also responsible for managing the eNB's part in the setup, configuration and reconfiguration of interfaces with neighbouring base stations 5. The communications control module 363 is also responsible for managing the eNB's part in mobility procedures including making mobility related decisions, selecting targets etc. (where applicable).

The Xn/X2 module 365 is responsible for the management of the eNB's traffic over the base station to base station interface(s) (under the overall control of the communications control module 363) such as X2 traffic between the eNB 5-1 and the en-gNB 5-2 in the EN-DC configuration of FIG. 1 (and/or X2 traffic with any other LTE base stations and/or Xn traffic with a gNB when forming part of an NE-DC or NGEN-DC configuration).

The CN interface module 367 is responsible for the management of the eNB's traffic over the base station to core network interface (under the overall control of the communications control module 363) such as S1-U/S1-C traffic between itself and with the EPC 7 in the EN-DC configuration of FIG. 1 (and/or traffic over the corresponding interface between itself and with the 5GC in NE-DC or NGEN-DC).

The SgNB management module 371 is responsible for managing procedures for interacting with secondary nodes (SNs) when eNB 5-1 is operating as a master eNB (e.g. when configured as the MeNB in the EN-DC configuration of FIG. 1). These procedures may include, for example, SgNB initiated SgNB modification procedures, MeNB initiated SgNB Modification procedures and/or the like.

The MeNB operation module 373 is responsible for operating the eNB as a master eNB (e.g. when configured as the MeNB in the EN-DC configuration of FIG. 1).

Distributed Base Station (gNB)

Figure 4:
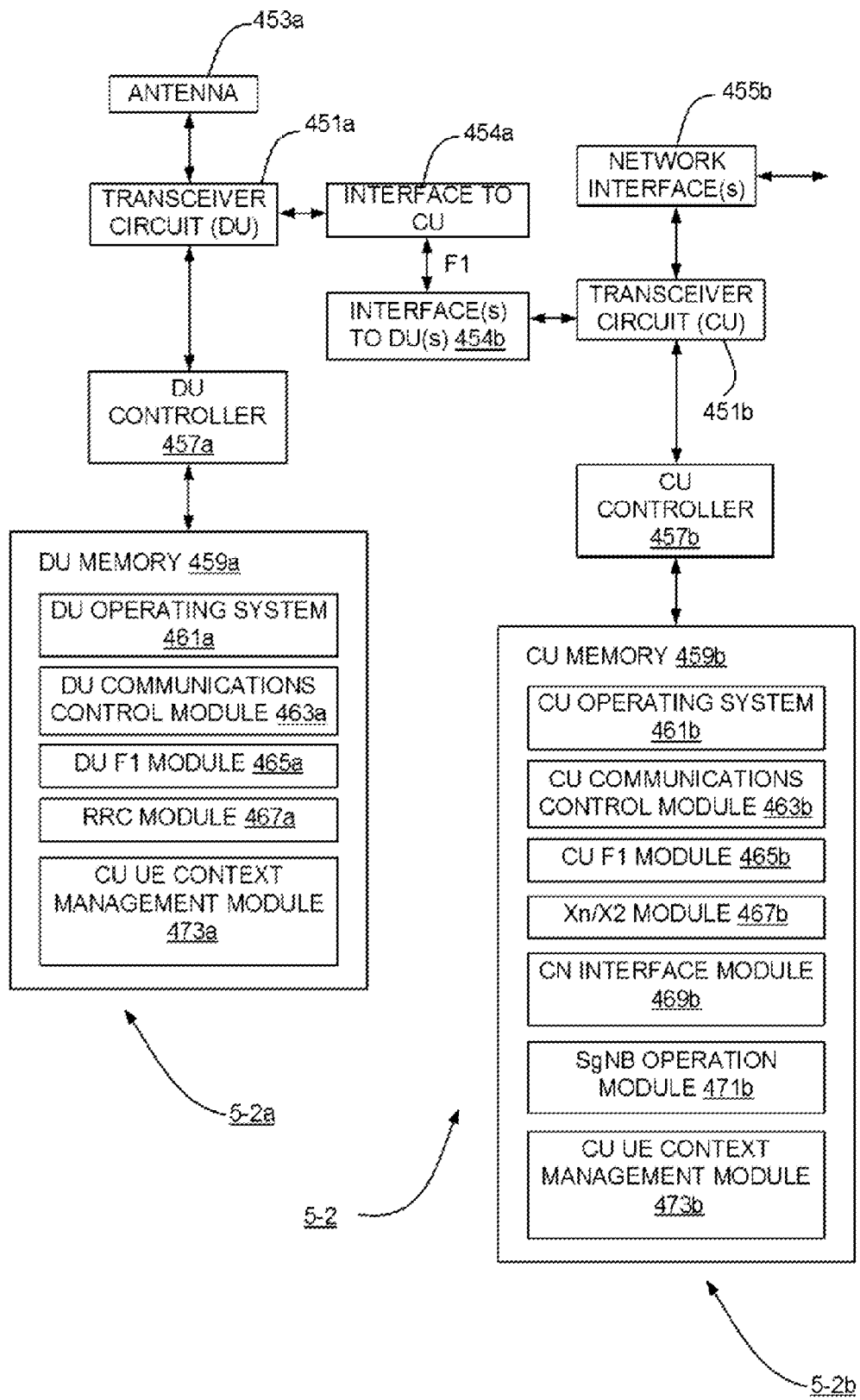
FIG. 4 is a simplified schematic block diagram of a distributed gNB forming part of the system shown in FIG. 1.

FIG. 4 is a block diagram illustrating the main components of a distributed type gNB 5-2 of the type shown in FIG. 1.

As shown, the gNB 5-2 includes at least one distributed unit 5-2a and a central unit 5-2b. Each unit 5-2a, 5-2b includes respective transceiver circuitry 451a, 451b. The distributed unit 5-2a transceiver circuitry 451a is operable to transmit signals to and to receive signals from UEs 3 via one or more antennae 453a and is operable to transmit signals to and to receive signals from the central unit 5-2b via an interface 454a.

The central unit 5-2b transceiver circuitry 451b is operable to transmit signals to and to receive signals from functions of the core network 7 and/or other gNBs 5 via network interfaces 456b. The network interfaces typically include a base station to core network interface (e.g. an S1-U interface) for communicating with the core network and one or more base station to base station interfaces (e.g. Xn/X2 interfaces) for communicating with other base stations (e.g. the MeNB 5-1 and/or other gNBs). The central unit 5-2b transceiver circuitry 451b is also operable to transmit signals to and to receive signals from one or more distributed units 5-2b via an interface 454b (e.g. the F1 interface).

Each unit 5-2a, 5-2b includes a respective controller 457a, 457b which controls the operation of the corresponding transceiver circuitry 451a, 451b in accordance with software stored in the respective memories 459a and 459b of the distributed unit 5-2a and the central unit 5-2b. The software of each unit includes, among other things, a respective operating system 461a, 461b, a respective communications control module 463a, 463b, a respective F1module 465a, 465b, and a respective UE context management module 473a, 473b. The central unit 5-2b also includes an Xn/X2 Module 467b, a CN interface module 469b and an SgNB operation module 471b. The distributed unit 5-2a also includes an RRC module 468a.

Each communications control module 463a, 463b, is operable to control the communication of its corresponding unit 5-2a, 5-2b including the communication from one unit to the other. The communications control module 463a of the distributed unit 5-2a controls communication between the distributed unit 5-2a and the UEs 3, and the communications control module 463b of the central unit 5-2b controls communication between the central unit 5-2b and any other network entities that are connected to the gNB 5-2 (e.g. the MeNB 5-1).

Each of the communications control modules 463a, 463b also respectively controls the part played by the distributed unit 5-2a and central unit 5-2b in the flow of uplink and downlink user traffic to be transmitted to and received from the UEs 3 served by gNB 5-2 including. Each communication control module 463a, 463b is responsible, for example, for controlling the respective part played by the distributed unit 5-2a and central unit 5-2b in procedures such as the communication of measurement control/configuration information, system information, the gNBs part in random access channel (RACH) procedures etc. Each communication control module 463a, 463b is also responsible, for example, for controlling the respective part played by the distributed unit 5-2a and central unit 5-2b in managing the gNBs part in the setup, configuration and reconfiguration of gNB to gNB interfaces with neighbouring gNBs. Each communication control module 463a, 463b is also responsible, for example, for controlling the respective part played by the distributed unit 5-2a and central unit 5-2b in managing the gNBs part mobility procedures including making mobility decisions, selecting targets etc. (where applicable).

Each of the F1 modules 465a, 465b is responsible for the management of the traffic over the CU to DU (F1) interface between the distributed unit 5-2a and the central unit 5-2b (under the overall control of the corresponding communications control module 463a, 463b).

The UE context management modules 473a, 473b are responsible setting up, managing and maintaining the UE context between the central unit 5-2b and the distributed unit 5-2a. The UE context management modules 473a, 473b are responsible, for example, for managing (under the overall control of the corresponding communications control module 463a, 463b) UE context related procedures such as, for example, UE Context setup procedures, UE context release procedures, UE context modification procedures and/or the like.

The Xn/X2 Module 467b of the central unit 5-2b is responsible for the management of the gNB's traffic over the base station to base station interface(s) (under the overall control of the communications control module 463b) such as X2 traffic with the MeNB 5-1 in the EN-DC configuration of FIG. 1 (and/or Xn traffic with other gNBs).

The CN interface module 469b of the central unit 5-2b is responsible for the management of the gNB's traffic over the base station to core network interface (under the overall control of the communications control module 463b) such as S1-U traffic between itself and with the EPC 7 in the EN-DC configuration of FIG. 1.

The SgNB operation module 471b of the central unit 5-2b is responsible for managing the operation the gNB 5-2 as a secondary gNB (e.g. when configured as an SgNB in the EN-DC configuration of FIG. 1).

The RRC module 468a of the distributed unit 5-2a is responsible for controlling the RRC layer functionality of the gNB 5-2 and corresponding RRC communication with the UE 3 (under the overall control of the communications control module 463a).

A number of procedures will now be described, by way of example only, which may be implemented to help provide efficient signalling mechanisms having a number of benefits.

UE Context Modification (gNB-CU Initiated with DU Configuration Query)

Figure 5:
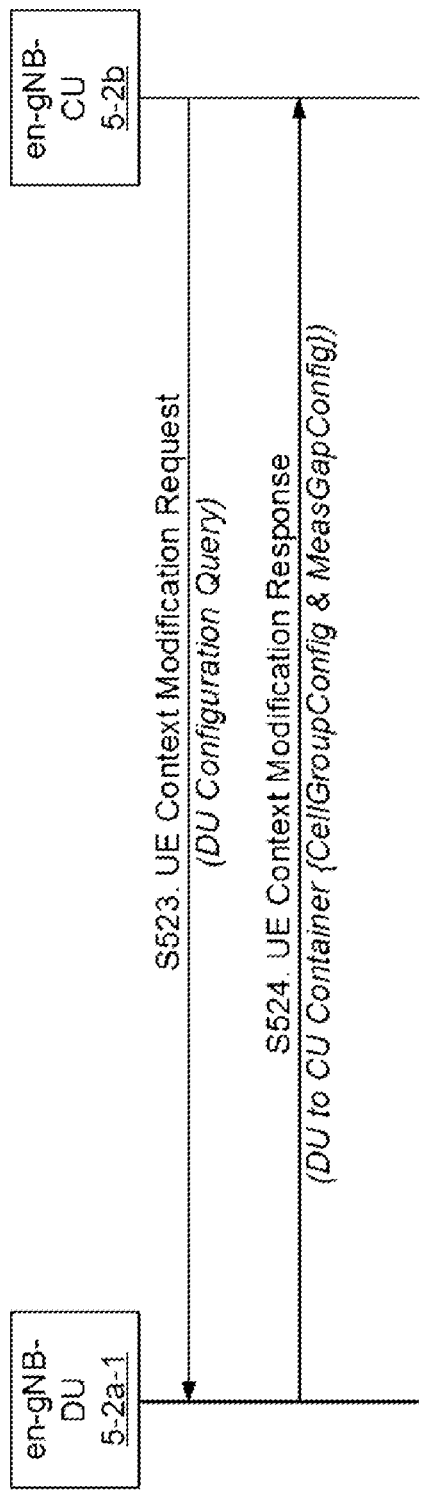
FIG. 5 is a simplified signalling diagram for a UE context modification procedure between a distributed and a central unit of a gNB.

Reference will now be made to FIG. 5, which is a simplified signalling diagram for a UE context modification procedure between a distributed unit (e.g. the source en-gNB-DU 5-2a-1 of FIG. 1) and a central unit (e.g. the en-gNB-CU 5-2b of FIG. 1) of a gNB 5-2.

In general, the purpose of the UE Context Modification procedure is to modify an established UE Context, e.g., establishing, modifying and releasing radio resources. The UE Context Modification procedure may also be used to command that a gNB-DU to stop data transmission for the UE for mobility purposes. The procedure uses UE-associated signalling. In the UE Context Modification procedure of FIG. 5, however, the procedure is used by the en-gNB-CU 5-2b to request the en-gNB-DU 5-2a-1 to provide its configuration information for a UE, and for the en-gNB-DU 5-2a-1 to provide, in response to the request, the configuration information for the UE.

As seen in FIG. 5, in step S523, the en-gNB-CU 5-2b initiates the procedure by sending, to the en-gNB-DU 5-2a-1, the F1AP UE Context Modification Request message including, together with the mandatory IEs required for any UE Context Modification Request message, a DU Configuration Query IE set to indicate that the purpose of the UE Context Modification Request message is to initiate the provision of configuration information for a UE 3 identified in the UE Context Modification Request message from the recipient.

Upon reception of the UE Context Modification Request message, the en-gNB-DU 5-2a-1 determines, based on the presence of the DU Configuration Query IE that the purpose of the UE Context Modification Request message was to initiate the provision of configuration information for a UE 3. The en-gNB-DU 5-2a-1 thus responds, at step S524, with a UE Context Modification Response message including a DU to CU Container carrying the full configuration information for the UE (e.g. cell group and measurement gap configuration information in the CellGroupConfig IE and MeasGapConfig IE respectively).

In summary, therefore, when the DU Configuration Query IE (or similar IE) is contained in (or set to 'true' in) the UE Context Modification Request message, the en-gNB-DU 5-2a-1 may include the CellGroupConfig IE as a full configuration, in the DU to CU Container IE in the UE Context Modification Response message.

An example of the information elements that may be included in a UE Context Modification Request message (including the DU Configuration Query IE) in the above procedure is provided in Table 1 (which includes Tables 1-1A and 1-1B). Table 2 (which includes Tables 1-2A and 1-2B), and Table 3 (which includes Tables 1-3A and 1-3B) below (the references in column 4 referring to 3GPP TS 38.473).

TABLE 1-1

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| SpCell ID | O | | NR CGI 9.3.1.12 | Special Cell as defined in TS 38.321 [16] | YES | ignore |
| ServCellIndex | M | | INTEGER (0 . . . 31) | | | |
| SpCell UL Configured | O | | Cell UL Configured 9.3.1.33 | | YES | ignore |
| DRX Cycle | O | | DRX Cycle 9.3.1.24 | | YES | ignore |

TABLE 1-1-continued

| IE/Group Name | Presence | Range | IE type and reference | Semantics description | Criticality | Assigned Criticality |
|---|---|---|---|---|---|---|
| CU to DU RRC Information | O | | 9.3.1.25 | | YES | reject |
| Transmission Stop Indicator | O | | 9.3.1.11 | | YES | ignore |
| Resource Coordination Transfer Container | O | | OCTET STRING | Includes the MeNB Resource Coordination Information IE as defined in subclause 9.2.116 of TS 36.423 [9]. | YES | ignore |
| RRC Reconfiguration Complete Indicator | O | | 9.3.1.30 | | YES | ignore |
| RRC-Container | O | | 9.3.1.6 | Includes the RRCConnectionReconfiguration message as defined in TS 38.331 [8]. | YES | ignore |
| SCell To Be Setup List | | 0 . . . 1 | | | YES | ignore |
| >SCell to Be Setup item IEs | | 1 . . . <maxnoofSCells> | | | EACH | ignore |
| >>SCell ID | M | | NR CGI 9.3.1.12 | SCell Identifier in gNB | — | — |
| >>SCellIndex | M | | INTEGER (1 . . . 31) | | | |
| >>SCell UL Configured | O | | Cell UL Configured 9.3.1.33 | | | |
| SCell To Be Removed List | | 0 . . . 1 | | | YES | ignore |
| >SCell to Be Removed Item IEs | | 1 . . . <maxnoofSCells> | | | EACH | ignore |
| >>SCell ID | M | | NR CGI 9.3.1.12 | SCell Identifier in gNB | — | — |

TABLE 1-2

| | | | | | | |
|---|---|---|---|---|---|---|
| SRB to Be Setup List | | 0 . . . 1 | | | | |
| >SRB to Be Setup Item IEs | | 1 . . . <maxnoofSRBs> | | | | |
| >>SRB ID | M | | 9.3.1.7 | | | |
| >>Duplication Indication | O | | ENUMERATED (true, . . .) | | YES | ignore |
| DRB to Be Setup List | | 0 . . . 1 | | | YES | reject |
| >DRB to Be Setup Items IEs | | 1 . . . <maxnoofDRBs> | | | EACH | reject |
| >>DRB ID | M | | 9.3.1.8 | | — | |
| >>CHOICE QoS Information | M | | | | YES | reject |
| >>>E-UTRAN QoS | M | | 9.3.1.19 | Shall be used for EN-DC case to convey E-RAB Level QoS Parameters | | |
| >>UL UP TNL Information to be setup List | | 1 | | | | |
| >>>UL UP TNL Information to Be Setup Item IEs | | 1 . . . <maxnoofULUPTNLInformation> | | | | |
| >>>>UL UP TNL Information | M | | UP Transport Layer Information 9.3.2.1 | gNB-CU endpoint of the F1 transport bearer. For delivery of UL PDUs. | — | — |
| >> RLC Mode | M | | 9.3.1.27 | | — | |
| >>UL Configuration | O | | UL Configuration 9.3.1.31 | information about UL usage in gNB-DU. | | |
| >>Duplication Activation | O | | 9.3.1.36 | information on the initial state of UL PDCP duplication | | |
| DRB to Be Modified List | | 0 . . . 1 | | | YES | reject |
| >DRB to Be Modified item IEs | | 1 . . . <maxnoofDRBs> | | | EACH | reject |
| >>DRB ID | M | | 9.3.1.6 | | — | |
| >>CHOICE QoS Information | M | | | | YES | reject |
| >>>E-UTRAN QoS | M | | 9.3.1.19 | Shall be used for EN-DC case to convey E-RAB Level QoS Parameters | | |
| >> UL UP TNL Information to be setup List | | 0 . . . 1 | | | | |

TABLE 1-3

| | | | | | | |
|---|---|---|---|---|---|---|
| >>> UL UP TNL Information to Be Setup Item IEs | | 1 . . . <maxnoofULUPTNLInformation> | | | | |
| >>>>UL UP TNL Information | M | | UP Transport Layer Information 9.3.2.1 | gNB-CU endpoint of the F1 transport bearer. For delivery of UL PDUs. | — | — |
| >>UL Configuration | O | | UL Configuration 9.3.1.31 | Information about UL usage in gNB-DU. | | |
| SRB TO Be Released List | | 0 . . . 1 | | | | |
| >SRB To Be Released Item IEs | | 1 . . . <maxnoofSRBs> | | | | |
| >>SRB ID | M | | 9.3.1.7 | | | |
| DRB to Be Released List | | 0 . . . 1 | | | YES | reject |
| >DRB to Be Released Item IEs | | 1 . . . <maxnoofDRBs> | | | EACH | reject |
| >>DRB ID | M | | 9.3.1.8 | | — | |
| Inactivity Monitoring Request | O | | ENUMERATED (true, . . .) | | YES | reject |
| RAT-Fequency Priority Informatin | O | | 9.3.1.34 | | YES | reject |
| DU Configuration Query | O | | ENUMERATED (true, . . .) | Used to request the DU to provide current DU configuration. | YES | reject |

Inter-gNB-DU Mobility Procedure (SgNB Initiated—Intra-NR)

Figure 6:
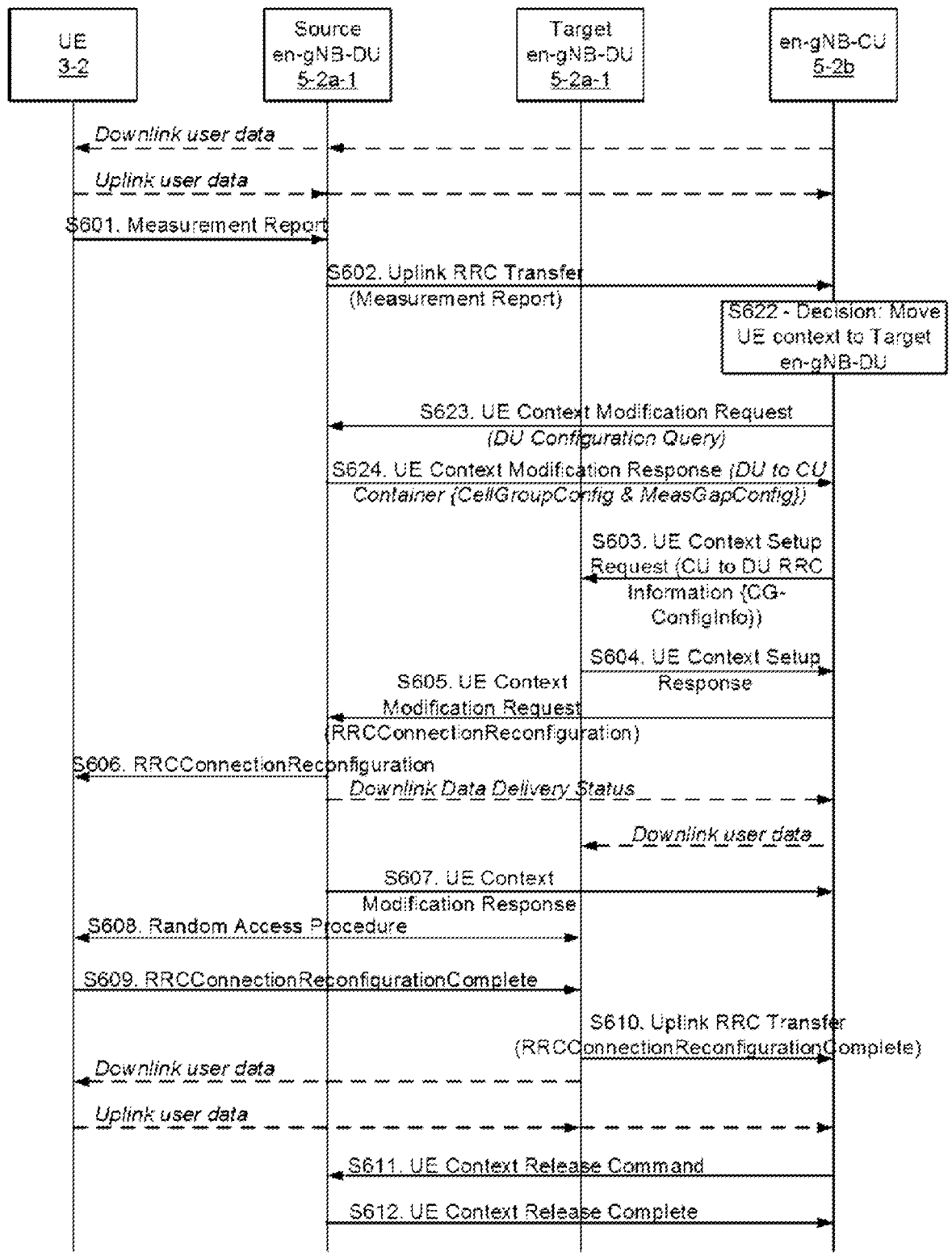
FIG. 6 is a simplified signalling diagram for an SgNB initiated Inter-gNB-DU mobility procedure during new radio (intra-NR) operation.

Reference will now be made to FIG. 6, which is a simplified signalling diagram for an SgNB initiated Inter-gNB-DU mobility procedure during new radio (intra-NR) operation. This procedure incorporates a procedure for obtaining a DU's full configuration information that is similar to that outlined briefly above with respect to FIG. 5.

This procedure is used in situations when the UE 3-2 moves from one gNB-DU (a source en-gNB-DU 5-2a-1) to another gNB-DU (a target en-gNB-DU 5-2a-1) within the same en-gNB-CU 5-2b during NR operation.

Initially, it can be seen that the UE 3-2 is in communication, in downlink and in uplink, with the en-gNB-CU 5-2b via the source en-gNB-DU 5-2a-1.

In step S601, the UE sends a Measurement Report message to the source en-gNB-DU 5-2a-1 and, at step S602 the source en-gNB-DU 5-2a-1 sends an Uplink RRC Transfer message to the gNB-CU to convey the received Measurement Report to the en-gNB-CU 5-2b.

At step S622, the en-gNB-CU 5-2b makes a decision to move the UE context for UE 3-2 to the target en-gNB-DU 5-2a-2 and sends, at step S623 a UE Context Modification Request message, that includes the DU Configuration Query IE (or similar indicator) to the source en-gNB-DU 5-2a-1. In effect, therefore, the presence of the DU Configuration Query IE indicates that the UE Context Modification Request message is for the purposes of obtaining the UE configuration information.

Upon reception of the UE Context Modification Request message, the en-gNB-DU 5-2a-1 determines, based on the presence of the DU Configuration Query IE that the purpose of the UE Context Modification Request message was to initiate the provision of configuration information for a UE 3. The en-gNB-DU 5-2a-1 thus responds, at step S624, with a UE Context Modification Response message including a DU to CU Container carrying the full configuration information for the UE (e.g. cell group and measurement gap configuration information in the CellGroupConfig IE and MeasGapConfig IE respectively).

At step S603, the en-gNB-CU 5-2b sends a UE Context Setup Request message to the target gNB-DU to create an UE context and setup one or more bearers. This message can thus include the full configuration information applied for the UE 3-2 at the source en-gNB-DU 5-2a-1 (e.g. in a CG-ConfigInfo IE in a CU to DU RRC Information IE) thereby enabling the target en-gNB-DU 5-2a-2 to apply a delta configuration.

The target en-gNB-DU 5-2a-2 responds to the en-gNB-CU 5-2b, at step S604, with a UE Context Setup Response message (e.g. including delta configuration information for use by the UE when establishing the connection with the target).

The en-gNB-CU 5-2b sends, at step S605, a further UE Context Modification Request message to the source en-gNB-DU 5-2a-1, which includes a generated RRCConnectionReconfiguration message (e.g. including the configuration information which may be delta configuration information) and indicates to stop the data transmission for the UE 3-2.

At step S606 the source en-gNB-DU 5-2a-1 forwards the received RRCConnectionReconfiguration message to the UE. The source en-gNB-DU 5-2a-1 also sends a Downlink Data Delivery Status frame to inform the en-gNB-CU 5-2b about any unsuccessfully transmitted downlink data to the UE 3-2 (as indicated by the dashed arrow). Downlink packets, which may include data not successfully transmitted in the source en-gNB-DU 5-2b, are then sent to the target e-gNB-DU 5-2a-2 by the en-gNB-CU 5-2b, as indicated by the 'downlink user data'.

At step S607 the source en-gNB-DU 5-2a-1 responds to the en-gNB-CU 5-2b with a further UE Context Modification Response message. A Random Access procedure is then performed between the UE 3-2 and the target en-gNB-DU 5-2a-2 at step 608.

At step S609, the UE 3-2 responds to the target en-gNB-DU 5-2a-2 with an RRCConnectionReconfigurationComplete message. The target en-gNB-DU 5-2a-2 sends, at S610, an Uplink RRC Transfer message to the en-gNB-CU 5-2b to convey the received RRCConnectionReconfigurationComplete message. Downlink packets can then be sent to the UE 3-2, as indicated by the 'downlink user data' arrow and uplink packets can sent from the UE 3-2, which are forwarded to the en-gNB-CU 5-2*b* through the target en-gNB-DU 5-2*a*-2 as indicated by the 'uplink user data' arrow.

The en-gNB-CU 5-2*b* then sends, in step S611, a UE Context Release Command message to the source en-gNB-DU 5-2*a*-1. Finally, the procedure is completed, in step S612, when the source en-gNB-DU 5-2*a*-1 releases the UE context and responds to the en-gNB-CU 5-2*b* with an UE Context Release Complete message.

Inter-gNB-DU Mobility Procedure (MeNB Initiated—EN-DC)

Figure 7:
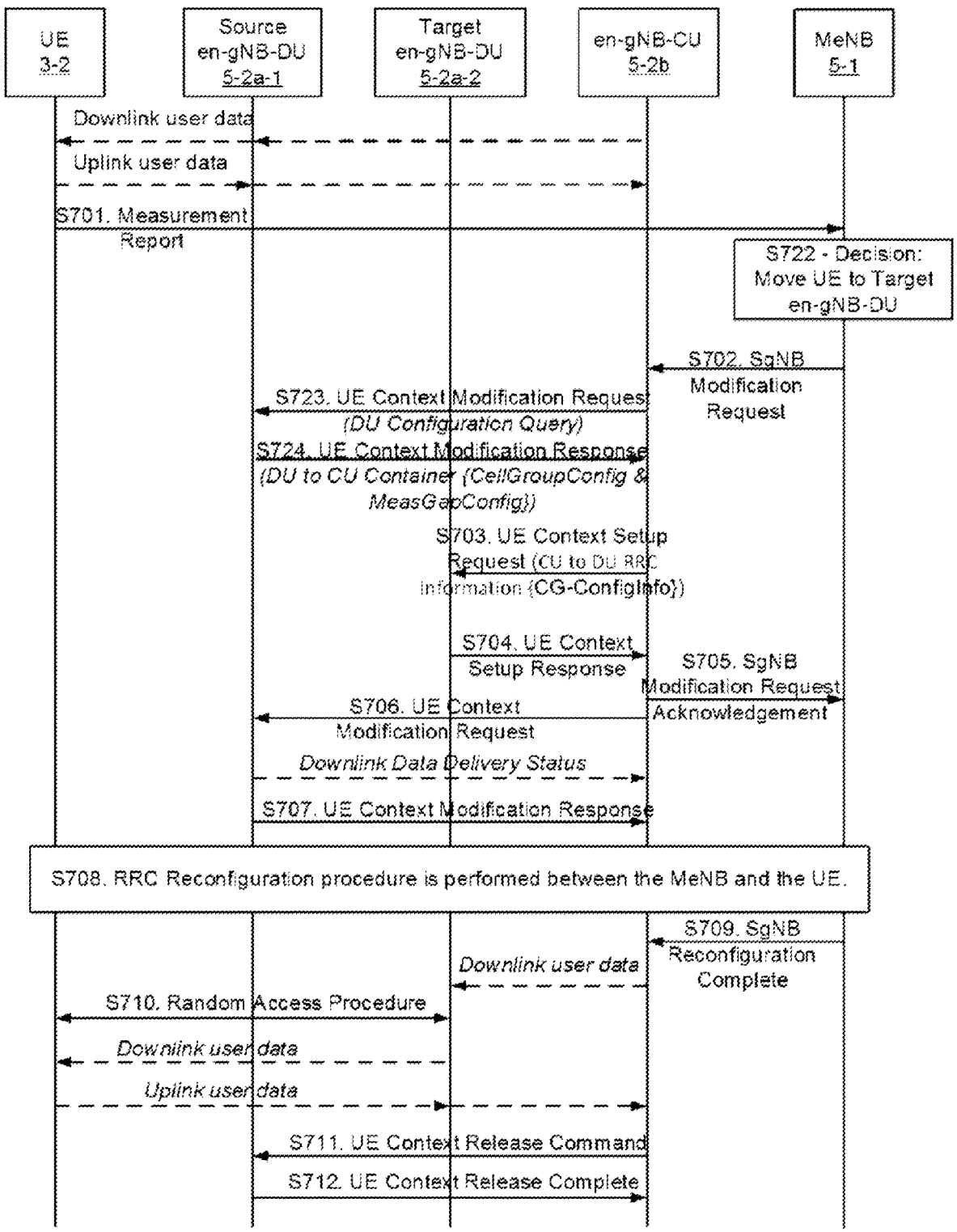
FIG. 7 is a simplified signalling diagram for an MeNB initiated Inter-gNB-DU mobility procedure in an EN-DC scenario.

Reference will now be made to FIG. 7, which is a simplified signalling diagram for an MeNB initiated Inter-gNB-DU mobility procedure in an EN-DC scenario. This procedure incorporates a procedure for obtaining a DU's full configuration information that is similar to that outlined briefly above with respect to FIG. 5.

This procedure may be used, for example, for situations when the UE 3-2 moves from one gNB-DU from one gNB-DU (a source en-gNB-DU 5-2*a*-1) to another gNB-DU (a target en-gNB-DU 5-2*a*-1) during EN-DC operation (e.g. when only a master cell group, 'MCG', signalling radio bearer, 'SRB' is available).

Initially, it can be seen that the UE is in communication, in downlink and in uplink, with the en-gNB-CU 5-2*b* via the source en-gNB-DU 5-2*a*-1.

In step S701, the UE sends a Measurement Report message to the MeNB 5-1.

At step S722, the MeNB 5-1 makes a decision (e.g. based on the measurement results) to move the UE context for UE 3-2 to the target en-gNB-DU 5-2*a*-2. To initiate the resulting mobility procedure, the MeNB 5-1 sends an SgNB Modification Request message to the en-gNB-CU 5-2*b* in step S702.

On receipt of the SgNB Modification Request message the en-gNB-CU 5-2*b* sends, at step S723, a UE Context Modification Request message that includes the DU Configuration Query IE (or similar indicator) to the source en-gNB-DU 5-2*a*-1. In effect, therefore, the presence of the DU Configuration Query IE indicates that the UE Context Modification Request message is for the purposes of obtaining the UE configuration information.

Upon reception of the UE Context Modification Request message, the en-gNB-DU 5-2*a*-1 determines, based on the presence of the DU Configuration Query IE that the purpose of the UE Context Modification Request message was to initiate the provision of configuration information for a UE 3. The en-gNB-DU 5-2*a*-1 thus responds, at step S624, with a UE Context Modification Response message including a DU to CU Container carrying the full configuration information for the UE (e.g. cell group and measurement gap configuration information in the CellGroupConfig IE and MeasGapConfig IE respectively).

At step S703, the en-gNB-CU 5-2*b* sends a UE Context Setup Request message to the target en-gNB-DU 5-2*a*-2 to create an UE context and setup one or more bearers. This message can thus include the full configuration information applied for the UE 3-2 at the source en-gNB-DU 5-2*a*-1 (e.g. in a CG-ConfigInfo IE in a CU to DU RRC Information IE) thereby enabling the target en-gNB-DU 5-2*a*-2 to apply a delta configuration.

The target en-gNB-DU 5-2*a*-2 responds to the en-gNB-CU 5-2*b*, at step S704, with a UE Context Setup Response message (e.g. including delta configuration information for use by the UE when establishing the connection with the target).

On receipt of the UE Context Setup Response message, in step S705, the en-gNB-CU 5-2*b* transmits an SgNB Modification Request Acknowledge message to the MeNB 5-1 (which may include the configuration information—delta or full) received in step S704.

Once the modification request acknowledgement message has been sent, the en-gNB-CU 5-2*b* proceeds in step S706 to send a further UE context modification request message to the source en-gNB-DU 5-2*a*-1, indicating that it is to stop the data transmission to the UE 3-2. The source en-gNB-DU 5-2*a*-1 sends a Downlink Data Delivery Status frame to the en-gNB-CU 5-2*b*, to inform the en-gNB-CU 5-2*b* about any unsuccessfully transmitted downlink data to the UE 3-2. The source en-gNB-DU 5-2*a*-1 sends, in step S707, a further UE Context Modification Response message to the en-gNB-CU 5-2*b*. Then, it is possible for the MeNB 5-1 and the UE 3-2 to perform, at step S708, an RRC Reconfiguration procedure, using the configuration information (which may be delta configuration information) received earlier in the procedure.

Subsequently, in step S709, the MeNB 5-1 sends an SgNB Reconfiguration Complete message to the en-gNB-CU 5-2*b*. Downlink packets, which may include data not successfully transmitted in the source en-gNB-DU 5-2*b*, are then sent to the target e-gNB-DU 5-2*a*-2 by the en-gNB-CU 5-2*b*, as indicated by the 'downlink user data'. A Random Access procedure is then performed between the UE 3-2 and the target en-gNB-DU 5-2*a*-2, in step S710. Downlink packets can then be sent to the UE 3-2, as indicated by the 'downlink user data' arrow and uplink packets can sent from the UE 3-2, which are forwarded to the en-gNB-CU 5-2*b* through the target en-gNB-DU 5-2*a*-2 as indicated by the 'uplink user data' arrow.

The en-gNB-CU 5-2*b* then sends, in step S711, a UE Context Release Command message to the source en-gNB-DU 5-2*a*-1. Finally, the procedure is completed, in step S712, when the source en-gNB-DU 5-2*a*-1 releases the UE context and responds to the en-gNB-CU 5-2*b* with an UE Context Release Complete message.

It will be appreciated that in the procedure of FIG. 7, the procedure for obtaining a DU's full configuration information using the UE Context Modification Request and Response messages may be triggered based on the presence of specific IE in the SgNB Modification Request message (e.g. an SCG Configuration Query IE or the like). Moreover, the MeNB 5-1 could obtain the source DU's configuration information by triggering a procedure similar to that of FIG. 5 at any appropriate time (e.g. by sending a SgNB Modification Request including an SCG Configuration Query IE or the like to query a current secondary cell group configuration for supporting delta configuration signalling at the MeNB) and then receiving the configuration information acquired using the procedure of FIG. 5 in an SgNB Modification Request Acknowledgement message.

Inter-gNB Handover (SgNB Initiated)

Figure 8:
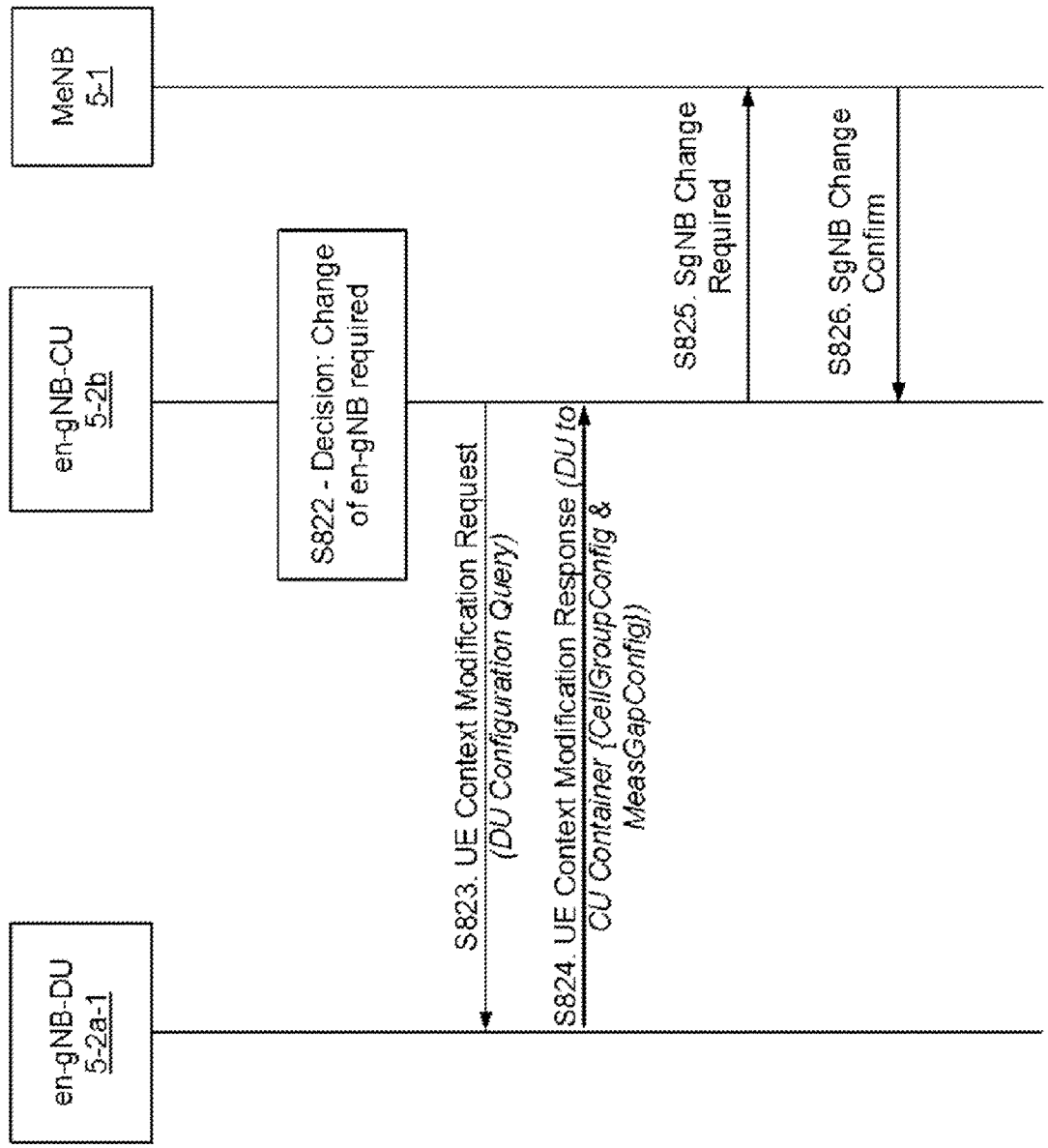
FIG. 8 is a simplified signalling diagram for an SgNB initiated inter-gNB handover procedure.

Reference will now be made to FIG. 8, which is a simplified signalling diagram for part of an SgNB initiated Inter-gNB handover procedure for a UE. This procedure incorporates a procedure for obtaining a DU's full configuration information that is similar to that outlined briefly above with respect to FIG. 5 in conjunction with an SgNB change procedure that is used by an en-gNB to request a change, to another en-gNB, for a specific UE. The procedure uses UE-associated signalling.

The procedure is triggered, at step S822, when the en-gNB-CU 5-2*b* makes a decision that a change to another gNB should be requested for a specific UE 3-2. The en-gNB-CU 5-2*b* sends, at step S823 a UE Context Modification Request message that includes the DU Configuration Query IE (or similar indicator) to the en-gNB-DU 5-2a-1. In effect, therefore, the presence of the DU Configuration Query IE indicates that the UE Context Modification Request message is for the purposes of obtaining the UE configuration information.

Upon reception of the UE Context Modification Request message, the en-gNB-DU 5-2a-1 determines, based on the presence of the DU Configuration Query IE that the purpose of the UE Context Modification Request message was to initiate the provision of configuration information for a UE 3. The en-gNB-DU 5-2a-1 thus responds, at step S824, with a UE Context Modification Response message including a DU to CU Container carrying the full configuration information for the UE (e.g. cell group and measurement gap configuration information in the CellGroupConfig IE and MeasGapConfig IE respectively).

The en-gNB-CU 5-2b then initiates the procedure by sending the SgNB change part of the procedure by sending, at step S825, an SgNB change message to the MeNB 5-1 including the target SgNB ID Information IE. The SgNB Change Required message may contain the SgNB to MeNB Container IE including the configuration information provided by the en-gNB-DU 5-2a-1.

If the MeNB 5-1 is able to perform the change requested by the en-gNB-CU 5-2b, the MeNB 5-1 sends, at step S826, with an SgNB Change Confirm message to the en-gNB-CU 5-2b with information indicating whether downlink and/or uplink data forwarding is required for radio access bearers (E-RABs) configured at the en-gNB-DU 5-2a-1.

The en-gNB-CU 5-2b may coordinate with the en-gNB-DU 5-2a-1 to start data forwarding and stop providing user data to the UE 3-2 upon reception of the SgNB Change Confirm message.

In case the request change cannot be performed successfully the MeNB 5-1 may respond with an SgNB Change Refuse message to the en-gNB-CU 5-2b with an appropriate cause value in the Cause IE.

SUMMARY

It can be seen, therefore, that by adding a DU Configuration Query IE (or a similar IE) to the F1AP: UE CONTEXT MODIFICATION REQUEST this can be used to trigger a DU to provide a full configuration of cell group configuration information (e.g. the contents of the CellGroupConfig IE) in a DU to CU Information container in the F1AP: UE CONTEXT MODIFICATION RESPONSE. The CU can then include this configuration information in an appropriate IE (e.g. the CG-ConfigInfo IE) to be sent to another DU during a mobility procedure involving a change of DU.

Modifications and Alternatives

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

For example, it will be appreciated that whilst the example of FIG. 1 involves an EN-DC configuration, it will be appreciated that the concepts described in relation to this example may be applied in any of the other MR-DC configurations described in the introduction above.

Moreover, whilst the above description describes that the configuration information provided by a distributed unit may be provided in the existing CellGroupConfig IE and MeasGapConfig IE in the DU to CU Container IE of a UE Context Modification Request message, it will be appreciated that the contents of the CellGroupConfig IE and MeasGapConfig IE may be duplicated in any message in which they are currently sent. This may be achieved, for example, either by having a second instance of the DU to CU Container IE (or a differently named IE corresponding to it) or by adding second instances of the CellGroupConfig IE and/or MeasGapConfig IE (or a differently named IEs corresponding to them) in the existing DU to CU Container IE. For example, each F1AP message containing the existing DU to CU Information IE may be adapted to include a new IE, e.g. a Secondary DU to CU Information IE, which could include the full configuration and which is included in the message at least when the DU to CU Information IE contains a delta configuration. The other option of duplicating the relevant IEs within the DU to CU Information IE might be achieved, for example, by adding Secondary CellGroupConfig and/or Secondary MeasGapConfig IE s within the existing DU to CU Information IE. These IEs may be used to describe the full configuration for example when a delta configuration is sent via one or both of the existing CellGroupConfig and MeasGapConfig IE s. Nevertheless, these options involve signalling of frequently unused full configuration descriptions.

Beneficially, with these variant methods, a DU can provide both a delta configuration and a full configuration at the same time. In this context, a further IE may be introduced in CU to DU signalling messages where appropriate, to indicate whether only a delta configuration, only a full configuration, or both a delta configuration and a full configuration are required. Alternatively or additionally, the conditions for including either one, or both, full and delta configurations in a given message may be fully or partially pre-programmed into the communication entity (e.g. DU or CU that provides them) and specified in the relevant standard.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above example embodiments, a number of software modules were described. As those skilled in the art will appreciate, the software modules may be provided in compiled or un-compiled form and may be supplied to the UE, the base station, as a signal over a computer network, or on a recording medium. Further, the functionality performed by part or all of this software may be performed using one or more dedicated hardware circuits. However, the use of software modules is preferred as it facilitates the updating of the UE, the base station, in order to update their functionalities.

The above example embodiments are also applicable to 'non-mobile' or generally stationary user equipment.

In summary therefore it can be seen that in one example described herein there is described, a method performed by a central unit of a distributed base station apparatus in a cellular communication system, the method comprising: sending, to a distributed unit of the distributed base station apparatus that serves a user equipment, 'UE', a first message comprising an information element, 'IE', for requesting the distributed unit of the distributed base station to provide a current distributed unit configuration; and receiving, from the distributed unit of the distributed base station apparatus, configuration information for the current distributed unit configuration in a second message sent in response to the first message.

In another example described herein there is described a method performed by a distributed unit of a distributed base station apparatus that serves a user equipment, 'UE', in a cellular communication system, the method comprising: receiving, from a central unit of the distributed base station apparatus, a first message comprising an information element, 'IE', for requesting the distributed unit of the distributed base station to provide a current distributed unit configuration; and sending, in response to the first message, to the central unit of the distributed base station apparatus, configuration information for the current distributed unit configuration in a second message.

In another example described herein there is described a central unit of a distributed base station apparatus of a cellular communication system, the central unit comprising: means for sending, to a distributed unit of the distributed base station apparatus that serves a user equipment, 'UE', a first message comprising an information element, 'IE', for requesting the distributed unit of the distributed base station to provide a current distributed unit configuration; and means for receiving, from the distributed unit of the distributed base station apparatus, configuration information for the current distributed unit configuration in a second message sent in response to the first message.

In another example described herein there is described a distributed unit of a distributed base station apparatus for serving a user equipment, 'UE', in a cellular communication system, the distributed unit comprising: means for receiving, from a central unit of the distributed base station apparatus, a first message comprising an information element, 'IE', for requesting the distributed unit of the distributed base station to provide a current distributed unit configuration; and means for sending, in response to the first message, to the central unit of the distributed base station apparatus, configuration information for the current distributed unit configuration in a second message.

The first message may comprise a request message and the second message may comprise a specific response message for responding to that request message. For example, the request message may comprise a UE context modification request message for requesting modification of a UE context and the response message may comprise a corresponding UE context modification response message for responding to that request message. The UE context modification request message and corresponding UE context modification response message may be messages of an application protocol, AP, specific to an interface between the central unit and distributed unit of the distributed base station apparatus. The UE context modification request message and corresponding UE context modification response message may be messages of the F1 application protocol, F1AP.

The information element for requesting the distributed unit of the distributed base station to provide a current distributed unit configuration may comprise a DU Configuration Query IE.

The information element for requesting the distributed unit of the distributed base station to provide a current distributed unit configuration may be a single bit IE that is set to 'true' to request the distributed unit to provide a current distributed unit configuration.

The configuration information, received in the second message, may be contained in a dedicated distributed unit to central unit container IE, DU to CU container IE, within the second message. The configuration information, received in the second message, may be contained in at least one further IE within the DU to CU container IE. The at least one further IE within the DU to CU container IE may comprise at least one of a cell group configuration IE and a measurement gap configuration IE. The configuration information, received in the second message may comprise at least one of cell group configuration information and measurement gap configuration information.

The method may further comprise making a decision to modify the UE context to a further distributed unit and the sending of the first message may be performed following said decision.

The method may further comprise receiving a request from a further base station apparatus to modify a UE context at the distributed base station apparatus and the sending of the first message may be performed following receipt of said request from a further base station apparatus.

The method may further comprise receiving a request from a further base station apparatus to query a current secondary cell group configuration for supporting delta configuration signalling at the further base station.

The further base station apparatus may comprise a fourth generation, 4G, base station, eNB, that operates according to 4G standards.

The method may be performed as part of a procedure to change the distributed unit serving the UE, wherein the distributed unit to which the first message is sent may be a source distributed unit in the procedure to change the distributed unit, and the further distributed unit may be a target distributed unit.

The method may further comprise: sending, to the further distributed unit of the distributed base station apparatus, a third message comprising the received configuration information; and receiving, from the further distributed unit a fourth message comprising distributed configuration information for the further distributed unit; wherein the distributed configuration information for the further distributed unit may comprise delta configuration information representing changes in the configuration information compared to the configuration information sent in the third message. The third message may comprise a UE context setup request message for requesting the setup of a context for the UE at the further distributed unit of the distributed base station apparatus, and the fourth message may comprise a corresponding UE context setup response message.

The distributed base station apparatus may be secondary base station apparatus, and the method may further comprise making a decision that there should be a change to the secondary base station apparatus serving the UE, and the sending of the first message may be performed following said decision. The method may further comprise sending, to a master base station apparatus, a message to indicate that a change of secondary base station apparatus is required, which message may comprise the received configuration information.

The distributed base station apparatus may comprise a fifth generation, 5G, base station, gNB, that operates according to 5G standards.

Various other modifications will be apparent to those skilled in the art and will not be described in further detail here.

The invention claimed is:

1. A method performed by a Central Unit (CU) of a distributed base station, the method comprising:
   sending, to a source Distributed Unit (DU) of the distributed base station, a user equipment (UE) CONTEXT MODIFICATION REQUEST message including a Configuration Query information element (IE) for requesting configuration information of the source DU, where the UE is determined to move from the source DU to a target DU of the distributed base station;
   receiving, from the source DU, a UE CONTEXT MODIFICATION RESPONSE message including configuration information indicating a cell group configuration of the source DU based on the UE CONTEXT MODIFICATION REQUEST message including the Configuration Query IE; and
   sending the configuration information indicating the cell group configuration of the source DU to the target DU or another base station.

2. The method according to claim 1, further comprising receiving a request from the another base station,
   wherein the sending the UE MODIFICATION REQUEST is performed based on the request.

3. The method according to claim 1, wherein the sending the configuration information indicating the cell group configuration of the source DU is performed by sending, to the target DU, the configuration information indicating the cell group configuration of the source DU,
   wherein the method further comprises receiving, from the target DU, configuration information indicating a cell group configuration of the target DU, and
   wherein the configuration information indicating the cell group configuration of the target DU includes delta configuration information representing a change from the cell group configuration of the target DU to the cell group configuration of the source DU.

4. The method according to claim 3, wherein the sending the configuration information indicating the cell group configuration of the source DU is performed by sending, to the target DU, the configuration information indicating the cell group configuration of the source DU, in a UE context setup message, and
   wherein the receiving the configuration information indicating the cell group configuration of the target DU is performed by receiving, from the target DU, the configuration information indicating the cell group configuration of the source DU, in a UE context setup response message.

5. A Central Unit (CU) of a distributed base station, the CU comprising:
   a transceiver; and
   a controller configured to control the transceiver to:
      send, to a source Distributed Unit (DU) of the distributed base station, a user equipment (UE) CONTEXT MODIFICATION REQUEST message including a Configuration Query information element (IE) for requesting configuration information of the source DU, where the UE is determined to move from the source DU to a target DU of the distributed base station;
      receive, from the source DU, a UE CONTEXT MODIFICATION RESPONSE message including configuration information indicating a cell group configuration of the source DU based on the UE CONTEXT MODIFICATION REQUEST message including the Configuration Query IE, and
      send the configuration information indicating the cell group configuration of the source DU to the target DU or another base station.

6. A non-transitory computer-readable storage medium having instructions stored thereon, which when executed by at least one processor of a Central Unit (CU) of a distributed base station, cause the CU to:
   send, to a source Distributed Unit (DU) of the distributed base station, a user equipment (UE) CONTEXT MODIFICATION REQUEST message including a Configuration Query information element (IE) for requesting configuration information of the source DU, where the UE is determined to move from the source DU to a target DU of the distributed base station;
   receive, from the source DU, a UE CONTEXT MODIFICATION RESPONSE message including configuration information indicating a cell group configuration of the source DU based on the UE CONTEXT MODIFICATION REQUEST message including the Configuration Query IE, and
   send the configuration information indicating the cell group configuration of the source DU to the target DU or another base station.

* * * * *